United States Patent [19]
Braun et al.

[11] Patent Number: 5,797,110
[45] Date of Patent: Aug. 18, 1998

[54] ENGINE TORQUE CONTROL

[75] Inventors: Eugene R. Braun, Royal Oak; Daniel G. Smedley, Farmington Hills; Russell C. Holmes, Troy; Thomas A. Gee, Allen Park, all of Mich.

[73] Assignee: Eaton Corporation, Cleveland, Ohio

[21] Appl. No.: 560,458

[22] Filed: Nov. 17, 1995

[51] Int. Cl.⁶ .............................. G06F 19/00; F16H 59/14
[52] U.S. Cl. .................. 701/84; 701/84; 701/87; 701/90; 701/54; 477/78
[58] Field of Search ............ 364/431.03, 424.08, 364/424.083, 424.084, 424.085, 424.09, 424.098, 426.029, 426.033, 426.036; 477/78, 110, 84, 120; 74/335, 336 R

[56] References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 364/424.1 |
| 5,305,213 | 4/1994 | Boardman et al. | 364/424.1 |
| 5,409,432 | 4/1995 | Steeby | 477/71 |
| 5,457,633 | 10/1995 | Palmer et al. | 364/431.09 |
| 5,487,004 | 1/1996 | Amsallen | 364/424.08 |
| 5,508,916 | 4/1996 | Markyvech et al. | 364/424.08 |
| 5,509,867 | 4/1996 | Genise | 477/120 |
| 5,529,548 | 6/1996 | Mack | 477/84 |

FOREIGN PATENT DOCUMENTS 0646924  4/1995  European Pat. Off. .
0661795  7/1995  European Pat. Off. .

*Primary Examiner*—Tan Q. Nguyen
*Attorney, Agent, or Firm*—Howard D. Gordon

[57] ABSTRACT

A control system/method for controlling engine (12) output torque in a vehicular powertrain system (10) including an electronically controlled engine and a torque load limited drivetrain system (11) is provided. The control will sense values of a control parameter (GR, OS) indicative of potential overloading of the drivetrain at maximum engine output torque and will cause engine output torque to be limited to a value less than the maximum value thereof.

38 Claims, 3 Drawing Sheets

ENGINE TORQUE CONTROL

BACKGROUND OF THE INVENTION

1. Field of the Invention

The present invention relates to a control system/method for limiting the torque applied to vehicular drivelines. In particular, the present invention relates to controls for vehicular powertrains preferably including an electronically controlled engine and a drivetrain having a limited torque transfer capacity wherein the value of a control parameter indicative of operating conditions at which potentially undesirably high torque loads in the drivetrain may occur (for example, engaged gear ratio and/or vehicle speed) are monitored and engine output (flywheel) torque is limited during the occurrence of potentially undesirably high driveline torque loading operating conditions.

2. Description of the Prior Art

Vehicular powertrains for vehicles including fuel-controlled engines, such as diesel engines, and drivetrains including a multiple-speed, change-gear transmission and a drive axle, are well known in the prior art. Examples of such vehicular powertrains and components thereof may be seen by reference to U.S. Pat. Nos. 3,105,395; 3,448,635; 4,361,060; 4,977,972; 4,595,986; 5,033,795 and 5,305,213, the disclosures of which are incorporated herein by reference.

Electronically controlled engines which include an engine microprocessor control and which communicate with other vehicle controllers, such as the transmission controller, over electronic data links are also known in the prior art. Typically, the engine controller and data link operate in accordance with an industry standard protocol, such as SAE J-1922, SAE J-1939, ISO 11898 or the like.

Prior art powertrain systems were not totally satisfactory, as, if sized to handle the maximum torque loading at low-speed operation, they were oversized for the majority of operating conditions and, if sized to handle the normally expected torque loads, were subject to damage at low-speed operation where the engine may generate a maximum or "burst" torque output.

SUMMARY OF THE INVENTION

In accordance with the present invention, the drawbacks of the prior art are minimized by the provision of a powertrain control which monitors the value of one or more control parameters and compares that value or values to a reference or references selected to be indicative of the existence of potentially undesirably high drivetrain torque loading. If potentially undesirably high drivetrain torque loading operating conditions are determined to exist, the torque output of the engine is limited to a value less than the maximum torque output thereof. Preferably, the engine is an electronically controlled engine communicating with an electronic data link using an industry standard protocol, such as SAE J-1922, SAE J-1939, ISO 11898 or the like, having one or more torque-limiting control modes.

Accordingly, it is an object of the present invention to provide a new and improved vehicular powertrain control method/system which will limit engine output torque during operating conditions, such as low transmission gear and/or low vehicle speed conditions, wherein full or burst engine output could result in undesirably high drivetrain torque loading.

This and other objects and advantages of the present invention will become apparent from a reading of the detailed description of the preferred embodiment taken in connection with the attached drawings.

DESCRIPTION OF THE PREFERRED EMBODIMENT

Figure 1:
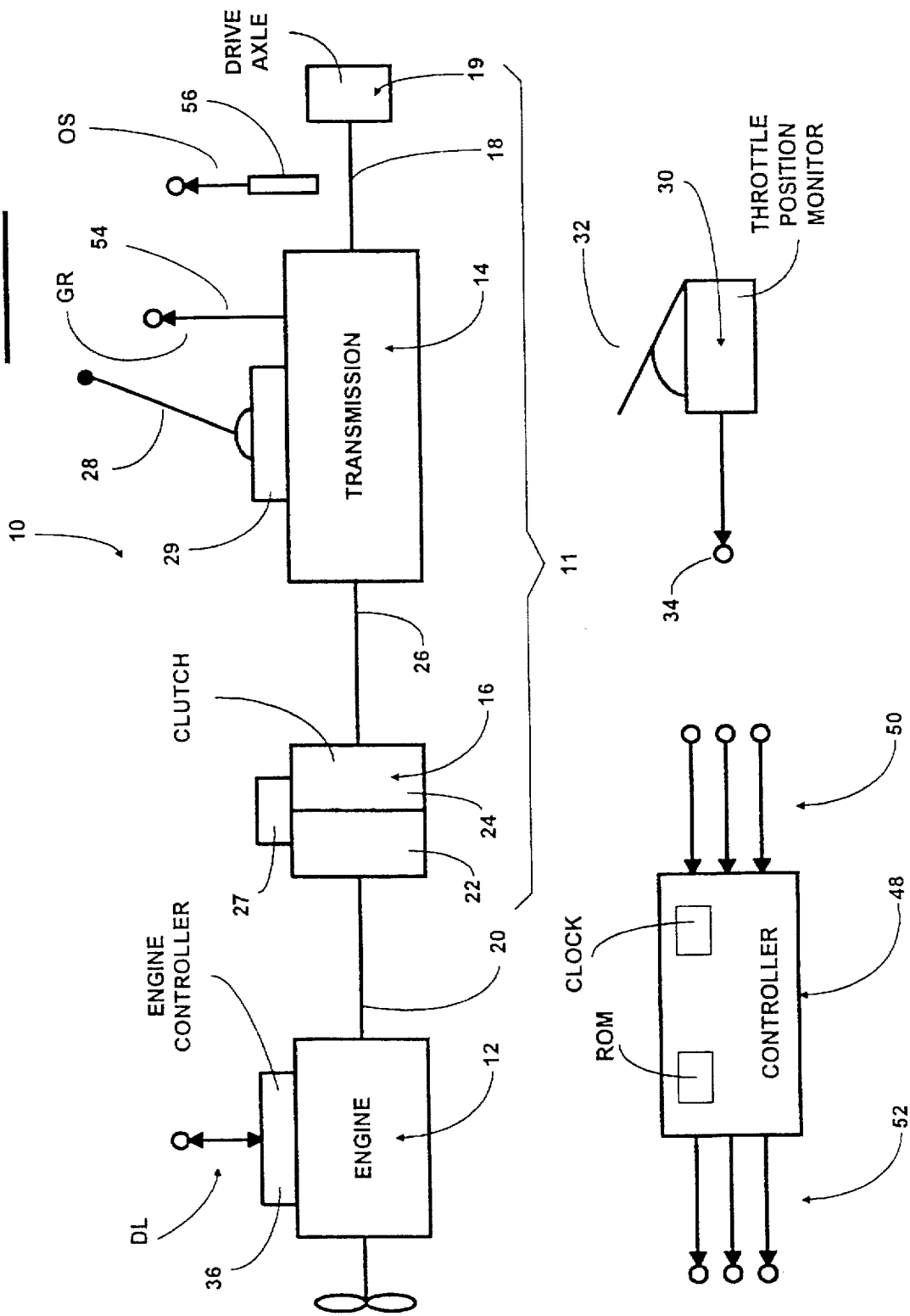
FIG. 1 is a schematic illustration of a vehicular powertrain system utilizing the present invention.

A typical vehicular powertrain 10 for a land vehicle, such as a heavy-duty truck, is schematically illustrated in FIG. 1. Powertrain 10 includes a drivetrain 11 driven by a prime mover 12, such as a well-known diesel engine. The drivetrain 11 includes a multiple-speed, change-gear transmission 14 connected to the engine 12 by a normally engaged master clutch 16 and having an output shaft 18 connected to a final drive 19, such as a transfer case and/or a drive axle. The crankshaft 20 of engine 12 drives the input elements 22 of clutch 16, which are frictionally engageable to and disengageable from output elements 24, which are fixed to the transmission input shaft 26. A manual or automatic control 27 controls the engagement and disengagement of clutch 26. Transmission 14 is preferably a 9-to-18-forward-speed transmission controlled by a manual shift lever 28 acting on a shift bar housing or shift shaft mechanism 29.

A throttle pedal monitor assembly 30 monitors the position or displacement of the throttle pedal 32 and provides an output signal 34 indicative thereof. The engine 12 includes a controller, preferably a microprocessor-based controller 36, which communicates over an electronic data link DL and is effective to fuel the engine in accordance with commands over the data link. Typically, commands will request fueling to match operator throttle settings or to achieve a required engine speed and/or to provide a maximum output (i.e., flywheel) torque.

A microprocessor-based system controller 48 receives input signals, such as signal 34 from the throttle pedal sensor, signal GR from the engaged gear ratio sensor 54 and/or signal OS from the output shaft rotational speed sensor 56, and processes same according to predetermined logic rules to issue command output signals 52, including signals on the data link DL to the engine controller 36.

Assuming the drivetrain 11 is configured and sized to handle a torque load less than the maximum possible torque load at low transmission ratios and maximum (burst) engine output torques, some protection for the driveline should be provided.

To provide a drivetrain which is economically sized while providing protection thereof under possible unusual, extraordinarily high torque loading operating conditions, a control parameter (such as engaged transmission gear ratio (GR) and/or vehicle speed (sensed as output shaft speed OS)) is sensed and compared to a reference value indicative of the value of the control parameter at potentially damaging high driveline torque operating conditions.

By way of example, if the engaged ratio is not greater than low gear and/or if vehicle speed is not greater than 4 mph, then engine output torque should be limited to less than maximum burst output torque to protect the vehicle drivetrain.

The limits on engine output torque may vary with the value of the control parameter. For example, assuming an engine burst output torque of 150% of rated output torque, at engagement of a deep reduction ratio (such as greater than 12:1), maximum engine output torque might be limited to 100% of rated output torque, while engagement of about a 10:1 reduction ratio will require that maximum engine output torque be limited to 120% of rated output torque, and engagement of a ratio having a reduction of less than 10:1 will not require any limitation on engine output torque.

Figure 2:
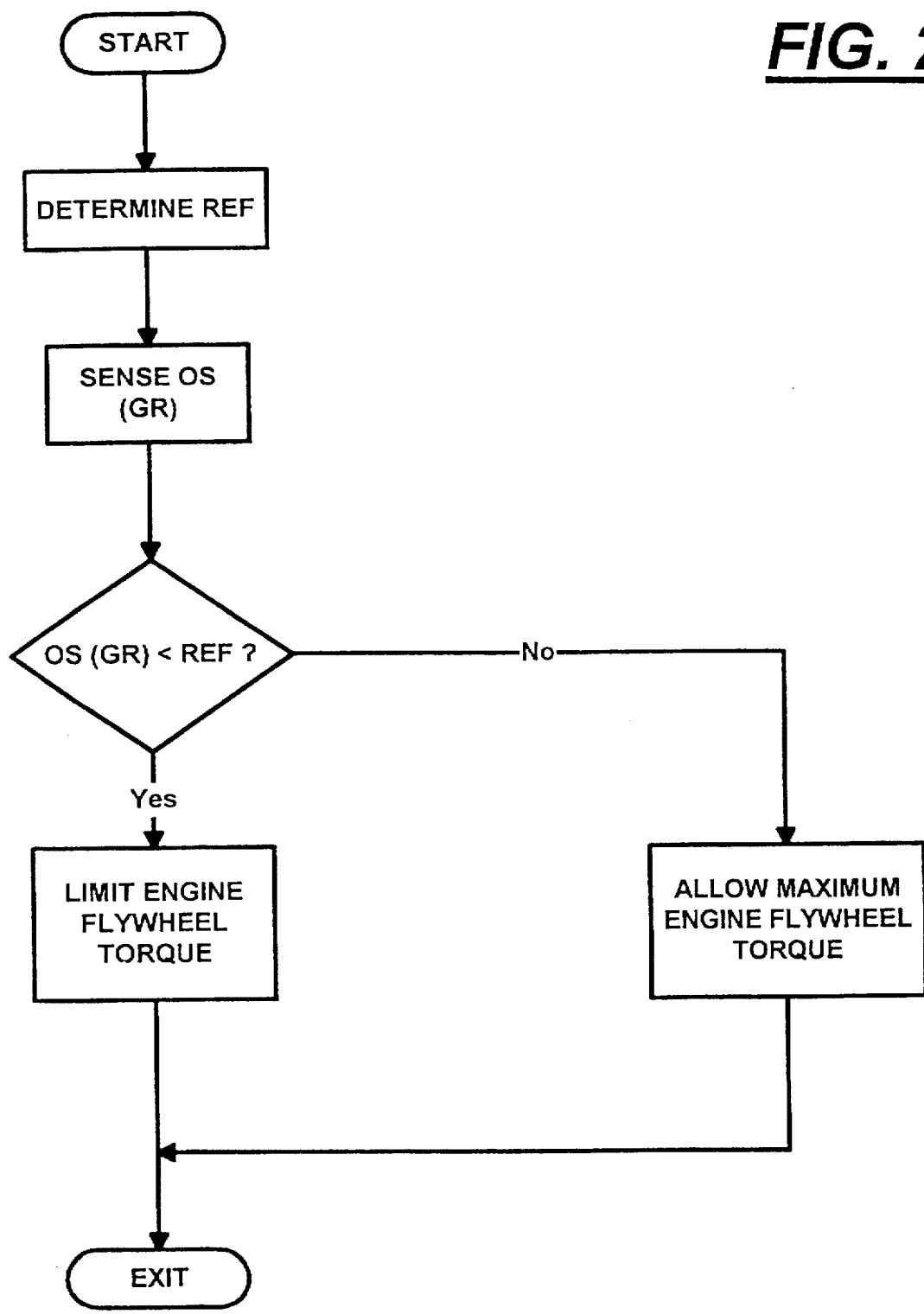
FIG. 2 is a schematic illustration, in flow chart format, of the present invention.

FIG. 2 is a flow chart representation of the control method/system of the present invention.

Figure 3:
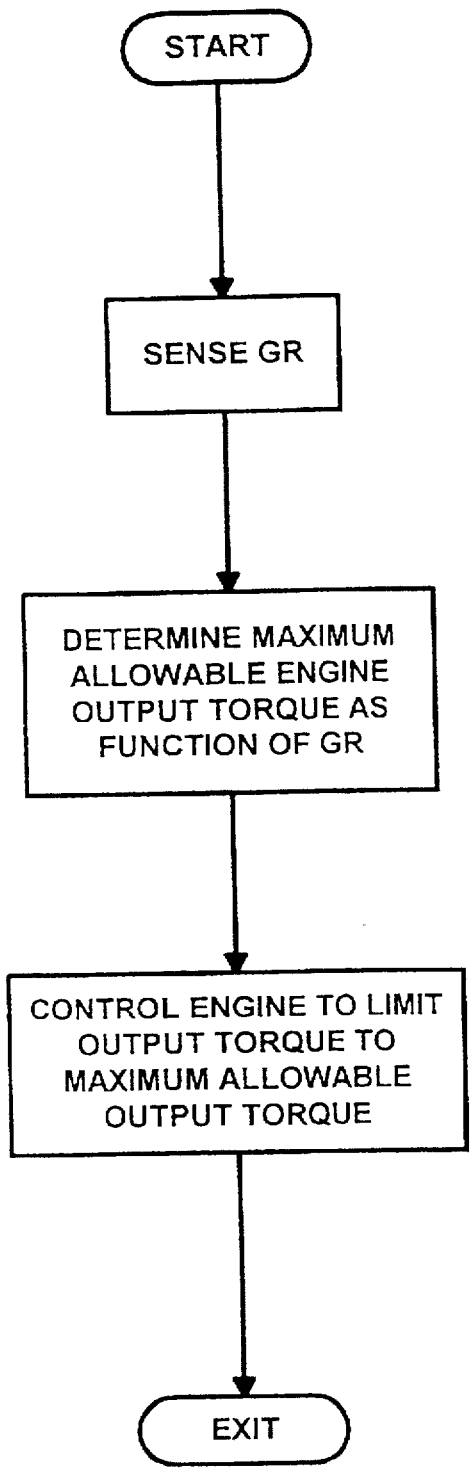
FIG. 3 is a schematic illustration, in flow chart format, of a further embodiment of the present invention.

FIG. 3 is a schematic illustration, in flow chart format, of a further embodiment of the present invention.

Although the present invention has been described with a certain degree of particularity, it is understood that various modifications are possible without departing from the spirit and the scope of the invention as hereinafter claimed.

We claim:

1. A method for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum output torque and an engine controller responsive to command signals to control fueling of the engine and, in at least one mode of operation, effective to limit engine output torque and said drivetrain having a predetermined maximum torque loading capacity, said drivetrain configured such that an expected torque loading on said drivetrain under a predetermined set of drivetrain high torque loading operating conditions and maximum engine output torque will exceed said predetermined maximum torque loading capacity, said method comprising sensing the value of a control parameter indicative of drivetrain operating conditions;

comparing the sensed value of said control parameter to a reference value corresponding to a value of said control parameter during drivetrain high torque loading operating conditions; and if the sensed value of the control parameter is indicative of the existence of drivetrain high torque loading operating conditions, causing said engine controller to limit engine output torque to a value less than maximum engine output torque.

2. The method of claim 1 wherein if said drivetrain high torque loading operating conditions are determined to exist, engine output torque is limited to 120% or less of rated engine output torque.

3. The method of claim 2 wherein said control parameter (GR) is indicative of transmission engaged gear ratio.

4. The method of claim 2 wherein said control parameter (OS) is indicative of vehicle ground speed.

5. The method of claim 1 wherein said control parameter (GR) is indicative of transmission engaged gear ratio.

6. The method of claim 1 wherein said control parameter (OS) is indicative of vehicle ground speed.

7. The method of claim 1 wherein said engine controller is microprocessor-based and communicates over an electronic data link.

8. The method of claim 1 wherein said transmission is manually shifted.

9. A computer program product for use in a vehicular onboard computer (48) for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum output torque and an engine controller responsive to command signals to control fueling of the engine and, in at least one mode of operation, effective to limit engine output torque and said drivetrain having a predetermined maximum torque loading capacity, said drivetrain configured such that an expected torque loading on said drivetrain under a predetermined set of drivetrain high torque loading operating conditions and maximum engine output torque will exceed said predetermined maximum torque loading capacity, said computer receiving input signals (50) indicative of the value of a control parameter indicative of drivetrain operating conditions, said program having codes for comparing the sensed value of said control parameter to a reference value corresponding to a value of said control parameter during drivetrain high torque loading operating conditions; and if the sensed value of the control parameter is indicative of the existence of drivetrain high torque loading operating conditions, causing said engine controller to limit engine output torque to a value less than maximum engine output torque.

10. The program of claim 9 wherein if said drivetrain high torque loading operating conditions are determined to exist, said code will cause engine output torque to be limited to 120% or less of rated engine output torque.

11. The program of claim 9 wherein said control parameter (GR) is indicative of transmission engaged gear ratio.

12. The program of claim 9 wherein said control parameter (OS) is indicative of vehicle ground speed.

13. The program of claim 9 wherein said engine controller is microprocessor-based and communicates with said onboard computer over an electronic data link.

14. The program of claim 9 wherein said transmission is manually shifted.

15. A system for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum output torque and an engine controller responsive to command signals to control fueling of the engine and, in at least one mode of operation, effective to limit engine output torque and said drivetrain having a predetermined maximum torque loading capacity, said drivetrain configured such that an expected torque loading on said drivetrain under a predetermined set of drivetrain high torque loading operating conditions and maximum engine output torque will exceed said predetermined maximum torque loading capacity, said system comprising means for sensing the value of a control parameter indicative of drivetrain operating conditions;

comparing the sensed value of said control parameter to a reference value corresponding to a value of said control parameter during drivetrain high torque loading operating conditions; and means effective, if the sensed value of the control parameter is indicative of the existence of drivetrain high torque loading operating conditions, causing said engine controller to limit engine output torque to a value less than maximum engine output torque.

16. The system of claim 15 wherein if said drivetrain high torque loading operating conditions are determined to exist, engine output torque is limited to 120% or less of rated engine output torque.

17. The system of claim 15 wherein said control parameter (GR) is indicative of transmission engaged gear ratio.

18. The system of claim 15 wherein said control parameter (OS) is indicative of vehicle ground speed.

19. The system of claim 15 wherein said engine controller is microprocessor-based and communicates over an electronic data link.

20. The system of claim 15 wherein said transmission is manually shifted.

21. A method for controlling a vehicular powertrain (10) comprising an electronically controlled engine (12) having a maximum flywheel torque, an engine control for limiting torque output of the engine, a driveline (11) driven by said engine and including a multiple-speed, change-gear transmission (14) and sensing means (54, 56) for sensing a value of a control parameter indicative of potential driveline torque; and method comprising:

determining a reference value of said control parameter corresponding to undesirably high potential driveline torque at full engine output torque;

comparing the current value of said control parameter to said reference; and if said current value of said control parameter indicates an undesirably high potential driveline torque at full engine output torque, causing said engine to operate at less than full torque output thereof.

22. The method of claim 21 wherein if said drivetrain high torque loading operating conditions are determined to exist, engine output torque is limited to 120% or less of rated engine output torque.

23. The method of claim 21 wherein said control parameter (GR) is indicative of transmission engaged gear ratio.

24. The method of claim 21 wherein said control parameter (OS) is indicative of vehicle ground speed.

25. The method of claim 21 wherein said engine controller is microprocessor-based and communicates over an electronic data link.

26. The method of claim 21 wherein said transmission is manually shifted.

27. A method for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum output torque and an engine controller responsive to command signals to control fueling of the engine and, in at least one mode of operation, effective to limit engine output torque, said drivetrain having a predetermined maximum torque loading capacity, said drivetrain configured such that an expected torque loading on said drivetrain under a predetermined set of drivetrain operating conditions defined by an engine output torque equal to or less than said maximum engine torque and transmission engaged ratio will exceed said predetermined maximum torque loading capacity, said method comprising sensing the value of a control parameter indicative of transmission engaged ratio; and causing said engine controller to limit engine output torque to a value determined as a function of transmission engaged gear ratio.

28. The method of claim 27 wherein said engine controller is microprocessor-based and communicates over an electronic data link.

29. The method of claim 28 wherein said transmission is manually shifted.

30. The method of claim 27 wherein said transmission is manually shifted.

31. A computer program product for use in a vehicular onboard computer (48) for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum output torque and an engine controller responsive to command signals to control fueling of the engine and, in at least one mode of operation, effective to limit engine output torque, said drivetrain having a predetermined maximum torque loading capacity, said drivetrain configured such that an expected torque loading on said drivetrain under a predetermined set of drivetrain operating conditions defined by transmission engaged gear ratio and an engine output torque less than or equal to said maximum engine output torque will exceed said predetermined maximum torque loading capacity, said computer receiving input signals (50) indicative of the value of a control parameter indicative of transmission engaged ratio, said program having codes for:

causing said engine controller to limit engine output torque to a value determined as a function of transmission engaged ratio.

32. The program of claim 31 wherein said engine controller is microprocessor-based and communicates with said onboard computer over an electronic data link.

33. The program of claim 32 wherein said transmission is manually shifted.

34. The program of claim 31 wherein said transmission is manually shifted.

35. A system for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum output torque and an engine controller responsive to command signals to control fueling of the engine and, in at least one mode of operation, effective to limit engine output torque, said drivetrain having a predetermined maximum torque loading capacity, said drivetrain configured such that an expected torque loading on said drivetrain under a predetermined set of drivetrain operating conditions defined by transmission engaged gear ratio and an engine torque less than or equal to said maximum engine output torque will exceed said predetermined maximum torque loading capacity, said system comprising:

means for sensing the value of a control parameter indicative of transmission engaged ratio; and means for causing said engine controller to limit engine output torque to a value determined as a function of transmission engaged ratio.

36. The system of claim 35 wherein said engine controller is microprocessor-based and communicates over an electronic data link.

37. The system of claim 36 wherein said transmission is manually shifted.

38. The system of claim 35 wherein said transmission is manually shifted.

* * * * *